No. 857,833. PATENTED JUNE 25, 1907.
T. RICKETTS.
WEED CUTTER.
APPLICATION FILED OCT. 6, 1906.

2 SHEETS—SHEET 1.

Witnesses
Edwin F. McKee

Inventor
Thomas Ricketts
By Victor J. Evans
Attorney

No. 857,833. PATENTED JUNE 25, 1907.
T. RICKETTS.
WEED CUTTER.
APPLICATION FILED OCT. 6, 1906.

2 SHEETS—SHEET 2.

Witnesses
Edwin G. McKee

Inventor
Thomas Ricketts
By Victor J. Evans
Attorney

UNITED STATES PATENT OFFICE.

THOMAS RICKETTS, OF STEELE, IDAHO.

WEED-CUTTER.

No. 857,833.  Specification of Letters Patent.  Patented June 25, 1907.

Application filed October 6, 1906. Serial No. 337,728.

*To all whom it may concern:*

Be it known that I, THOMAS RICKETTS, a citizen of the United States, residing at Steele, in the county of Nez Perces and State of Idaho, have invented new and useful Improvements in Weed-Cutters, of which the following is a specification.

This invention relates to weed cutters and one of the principal objects of the same is to provide a machine for this purpose which will be simple in construction, reliable in operation and which will sever the weeds and throw them back as the machine passes over the ground.

Another object of the invention is to provide a rotating cutter comprising a drum and diagonally disposed knives secured thereto and to provide said drum with yielding bearings which will hold the cutter in contact with the ground as the machine is brought over the field.

Another object of the invention is to provide means for raising and lowering the cutter to throw the same into and out of operative position.

Figure 1:
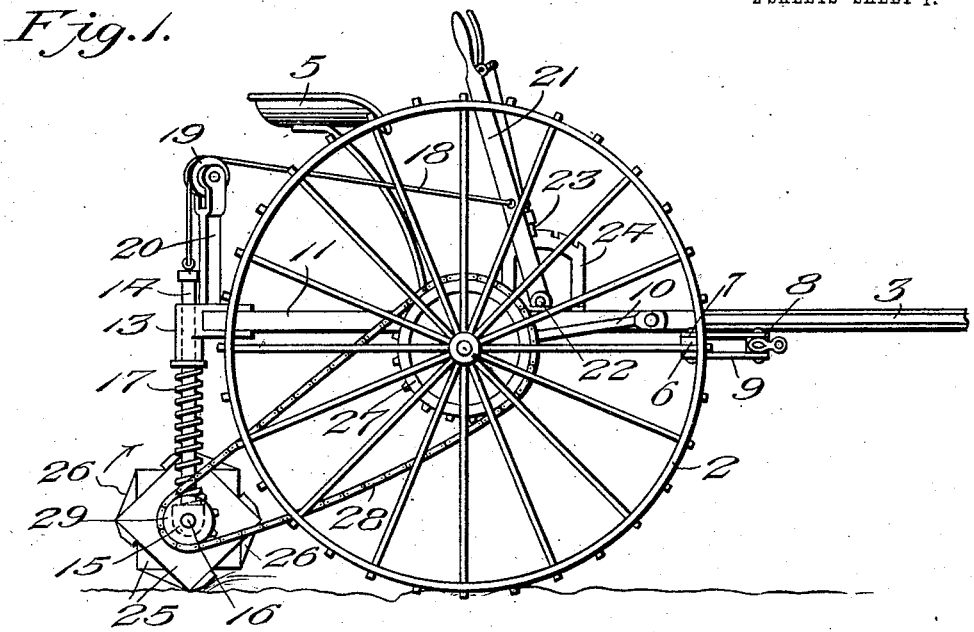
Figure 2:
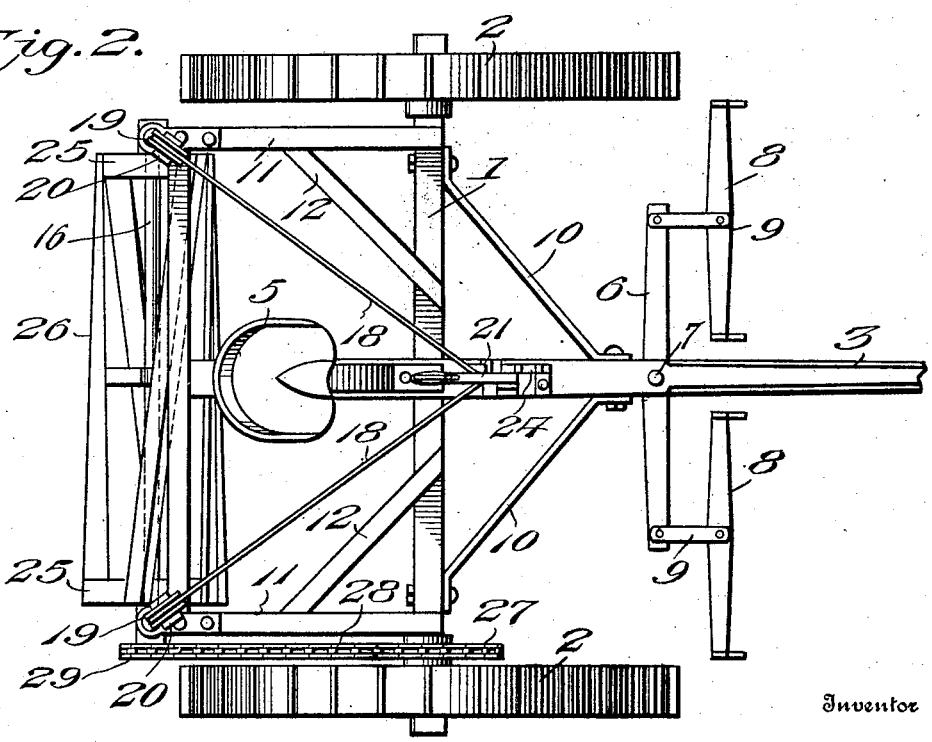
Figure 3:
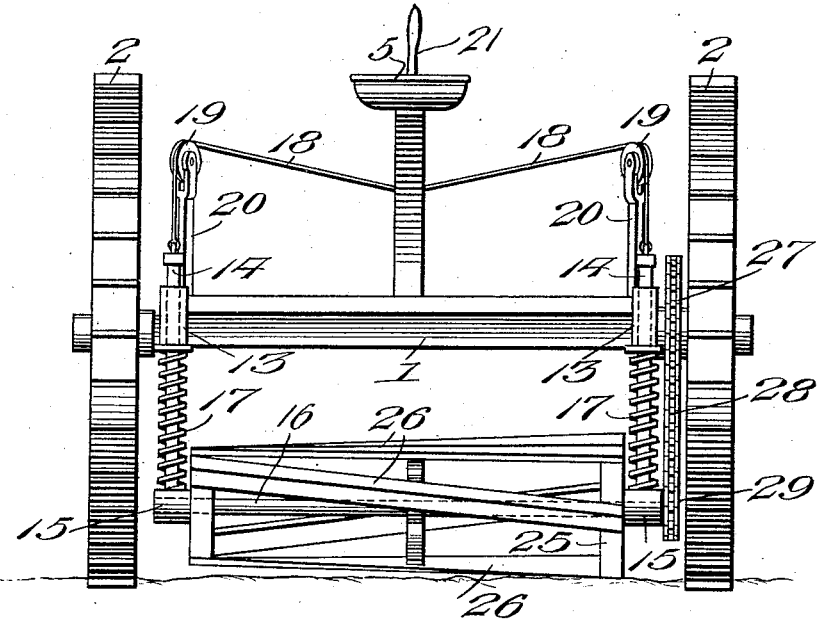
Figure 4:
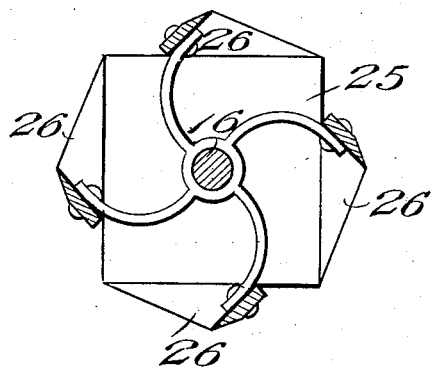

These and other objects may be attained by means of the construction illustrated in the accompanying drawings, in which:

Figure 1 is a side elevation of a weed cutter made in accordance with my invention. Fig. 2 is a plan view of the same. Fig. 3 is a rear end elevation. Fig. 4 is a detail section through the rotating cutter.

Referring to the drawings for a more particluar description of my invention, the numeral 1 designates the axle upon the ends of which are journaled the ground wheels 2, one of said wheels serving as a drive-wheel for operating the rotary cutter. A draft tongue 3 is secured to the axle, and upon said tongue a driver's seat 5 is supported. A doubletree 6 is pivoted at 7 under the tongue and the swingletrees 8 are connected by straps 9 to the doubletree. Diagonal braces 10 extend from the tongue to the axle. A cutter frame extends rearward from the axle and comprises the rearwardly extending bars 11 and the diagonal braces 12. Connected to each of the bars 11 is a bearing 13 for a vertical shaft 14, the lower end of said shaft having a journal bearing 15 thereon to accommodate the shaft 16 of the rotary cutter. A spring 17 surrounds the shaft 14, said spring bearing at its upper end against the bracket 13 and its lower end bearing against the journal bearings on said shaft 14. At the upper end of the shaft 14, a cord 18 is secured, said cord passing over a pulley 19 journaled in the upper end of a bracket 20 and extending thence forward to a lever 21 pivoted at 22 upon the tongue 3 of the implement. The lever 21 is provided with a pawl 23 designed to engage a notched segment 24 rising from the tongue.

The rotary cutter comprises a sleeve which surrounds the axle 16 and is provided with curved arms secured to the outer ends of which are the knives or cutters 26, said knives extending diagonally from one of the end blocks 25 to the other and being centrally braced by a similar block. It is to be noted that the cutting edges of the knives are disposed toward the front of the machine and extend tangentially from the bearing blocks, as shown in Fig. 4.

A sprocket wheel 27 is fixed upon the axle 1 inside the ground wheel 2 and a chain 28 passes around said sprocket wheel and around a sprocket wheel 29 secured to one end of the shaft 16 of the cutter.

The operation of my weed cutter may be briefly described as follows: As the machine is drawn over the ground, the cutter is rotated in the direction indicated by the arrow in Fig. 1, and the knives are presented to the weeds or stalks which have been bent down to the ground by the rotation of the cutter, the edges of the knives severing the weeds lying upon the ground. The springs 17 force the cutter downward into the ground and the lever 21 is used to raise the cutter from the ground when the implement is conveyed from place to place.

From the foregoing, it will be obvious that a machine constructed in accordance with my invention will operate to bend the weeds down upon the ground and sever them as the machine passes over the field; that the machine is of comparatively simple construction, composed of few parts, and will not readily get out of order.

Having thus described my invention, what I claim is:

In a machine of the character described, vertically disposed shafts, a rotary cutter journaled in the ends of said shafts, springs surrounding said shafts to hold said cutter yieldingly upon the ground, cords secured to the upper ends of said shafts and passing over pulleys, brackets secured to the frame for supporting said pulleys, a lever to which said cords are secured, and a rack for holding said lever in position to raise the cutter from the ground.

In testimony whereof, I affix my signature in presence of two witnesses.

THOMAS RICKETTS.

Witnesses:
  N. E. WALKER,
  R. M. WALKER.